United States Patent [19]
Combest

[11] Patent Number: 6,019,427
[45] Date of Patent: Feb. 1, 2000

[54] VEHICLE SUPPORTED SWING SEAT METHOD AND APPARATUS

[76] Inventor: Bill A. Combest, 2520 Valmar Pl., Reno, Nev. 89503

[21] Appl. No.: 09/073,017

[22] Filed: May 4, 1998

Related U.S. Application Data

[62] Division of application No. 08/700,667, Jul. 30, 1996, Pat. No. 5,816,646.

[51] Int. Cl.[7] .................................................. A47D 13/10
[52] U.S. Cl. .......................................... 297/277; 297/273
[58] Field of Search ...................... 472/118; 297/411.44, 297/378.1, 35, 277, 280, 273, 281, 282, 217.1

[56] References Cited

U.S. PATENT DOCUMENTS

| | | |
|---|---|---|
| 125,195 | 4/1872 | James .......................................... 297/35 |
| 295,946 | 4/1884 | Robinius .............................. 297/277 X |
| 1,346,973 | 7/1920 | Padden . |
| 1,369,747 | 2/1921 | Jordan . |
| 1,417,443 | 5/1922 | Baugher et al. ......................... 297/280 |
| 1,677,844 | 7/1928 | Patton . |
| 4,838,609 | 6/1989 | Christensen . |
| 4,917,378 | 4/1990 | Girecky et al. ...................... 297/273 X |
| 4,938,534 | 7/1990 | Tornero .................................. 297/35 X |
| 5,058,951 | 10/1991 | Thiel ....................................... 297/273 |
| 5,842,741 | 12/1998 | Onorini ............................... 297/273 X |

*Primary Examiner*—Milton Nelson, Jr.
*Attorney, Agent, or Firm*—Herbert C. Schulze

[57] ABSTRACT

A folding and transportable swing supported by a collapsible and transportable framework attached to a vehicle such as a motor home or the like.

1 Claim, 3 Drawing Sheets

VEHICLE SUPPORTED SWING SEAT METHOD AND APPARATUS

CROSS REFERENCE TO RELATED PATENT APPLICATIONS

This application is related to, and is a division of my application for Vehicle Support Member Method and Apparatus filed Jul. 30, 1996, Ser. No. 08/700,667, now U.S. Pat. No. 5,816,646.

BACKGROUND OF THE INVENTION

I. Field of the Invention

This invention is in the general field of methods and apparatus for supporting loads above a base level;

The invention is more particularly directed to such a method and apparatus used as an adjunct to some other structure;

The invention is most particularly directed to such a method and apparatus utilized in cooperation with recreational vehicles and the like.

II. Description of the Prior Art

I am aware of various supporting frameworks which have been developed in the past. Such items are generally comprised of a pair of inverted "v" members, or the equivalent, with a bar or the like connected between them. Examples of such prior art will be found in U.S. Pat. Nos. 4,620,702; 4,917,378; 4,268,087; 4,537,392; 4,256,300; 4,537,392; 3,167,290; 2,984,444; 1,725,168; and 812,3444. There have even been some developments in other countries such as German patent number 860,142; Swiss patent number 176,274; and British patent number 620,350.

I have spent considerable time studying this field, particularly as to a method and apparatus which might be used in conjunction with recreational vehicles such as motor homes and the like. Included in this study has been a careful review of the aforementioned patents. The closest that any of them can come to my method and apparatus is U.S. Pat. No. 4,256,300 in the embodiment shown in FIG. 5. However, even this is not practical for adaptation to recreational vehicles.

With all of the foregoing in mind, I concluded that there really is no useful prior art which could be employed for the uses set forth in this patent application. Thus I can truthfully state that I know of no applicable prior art as to the within disclosed invention.

SUMMARY OF THE INVENTION

At the present time there are large numbers of recreational vehicles in wide use throughout the world, and particularly in the United States. These recreational vehicles include motor homes, travel trailers, campers mounted on trucks, and the like. The users of such vehicles desire a number of auxiliary utilities such as swings, laundry drying racks, support for food items out of reach of animals, game dressing supports, and the like.

Generally speaking, all recreational vehicles have a limited capacity to carry extra equipment as cargo or exterior mounted accessories due to the limited amount of cargo space available and due to vehicle width restrictions, driving requirements and the like.

I have studied this at length and have now conceived and developed an invention of a novel and effective method and apparatus to be used in supplying greatly enhanced utility and convenience to recreational vehicles. Included in my invention is a method and apparatus to provide for attachment of a framework, cooperative with a recreational vehicle, to enable the addition of swings, game dressing supports, laundry drying racks, food supporting frames, and a variety of other uses.

I have accomplished the foregoing by a unique socket-bracket member attached to the side of the recreational vehicle connecting to an unusual collapsible and telescoping supporting framework, with attachment means included for properly hanging various utility and recreational accessories. In addition, and as a sub-invention, I have devised a unique collapsible swing seat to be utilized in cooperation with the framework.

Thus, it is an object of this invention to provide a method and apparatus for supporting frameworks to use in cooperation with recreational vehicles;

Another object is to provide such a method and apparatus wherein a recreational swing can be provided in conjunction with a recreational vehicle;

Another object is to provide a supporting frameworks to be used for drying racks in conjunction with recreational vehicles;

The foregoing and other objects and advantages of this invention will become apparent to those skilled in the art upon reading the description of a preferred embodiment, which follows, in conjunction with a review of the appended drawings.

DESCRIPTION OF A PREFERRED EMBODIMENT

Figure 1:
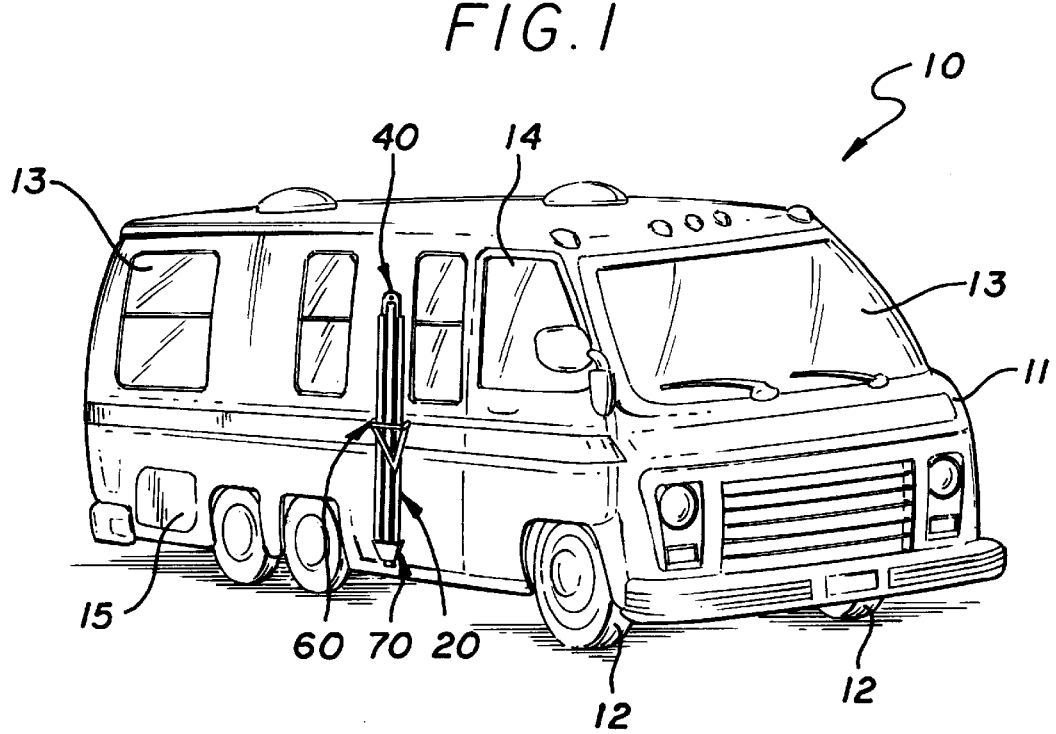
FIG. 1 is a schematic perspective of a motor home equipped with an apparatus suitable to practice the method of this invention.

FIG. 1 shows a motor home 10 having a customary body 11, wheels 12, windows 13, door 14, and storage compartment 15. An apparatus 20, suitable to practice the method of this invention is shown pivotally connected to the motor home at 40 and locked in position for traveling at locking bars 60 connected to the motor home.

Figure 2:
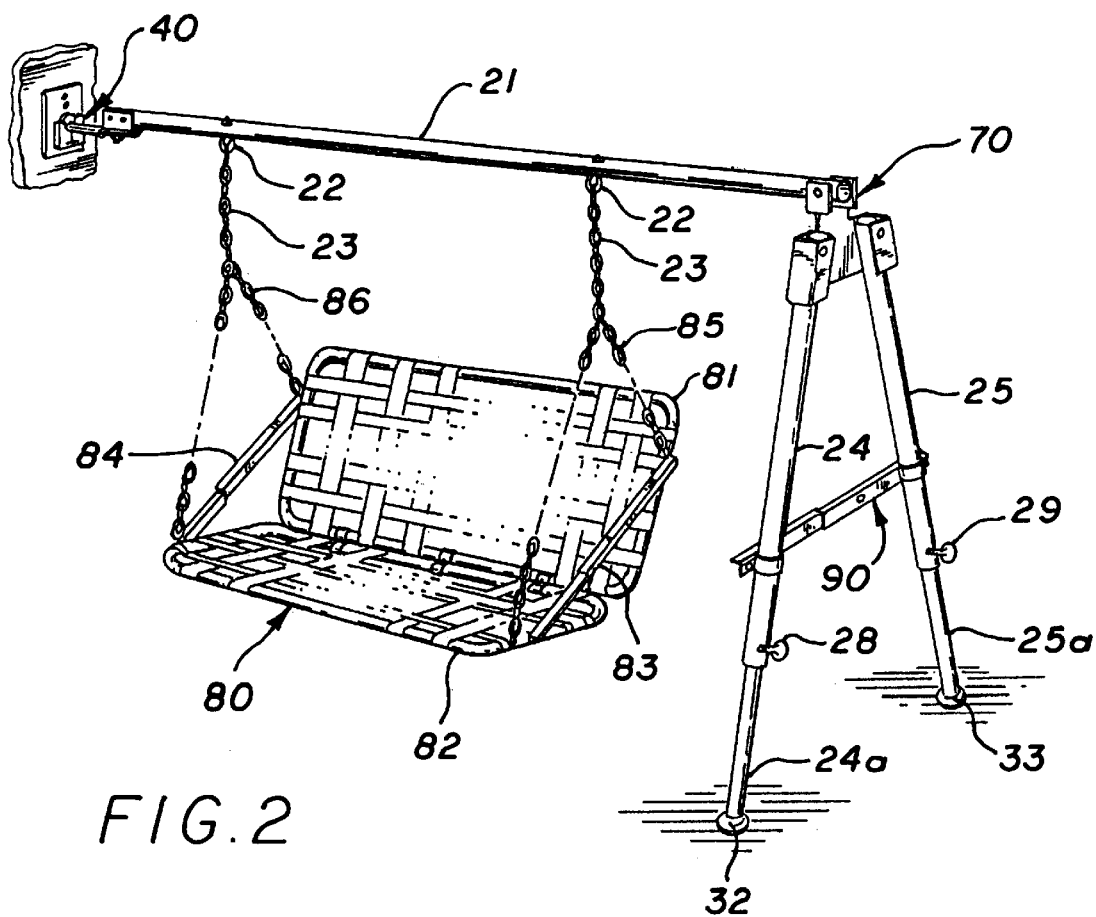
FIG. 2 is an enlarged schematic perspective of the apparatus suitable to practice the method of this invention shown folded and in transport mode in FIG. 1.

FIG. 2 shows the apparatus extended and in its useful configuration, with a swing 80 suspended from the horizontal bar 21 by means of hooks or the like 22 fastened to the bar 21, and chains or the like 23 in a manner which will be understood by those skilled in the art. The swing 80, in itself, is believed to be an independent sub-invention as revealed by the detailed description and in the claims which will follow.

When in use, as in FIG. 2, the horizontal bar 21 (which will preferably be made of tubing) is connected to the motor home at 40 by a unique pivoting flange and socket arrangement (the details of which will be found in FIG. 4) and supported by legs 24–24a and 25–25a. As indicated in the drawings, the leg portions 24 and 25 will have telescoping members 24a and 25a. The legs will have self adjusting feet, as are known to those skilled in the art, at 32 and 33. The telescoping leg members will be held in position by screws or the like 28 and 29 which may be inserted in holes in the telescoping portions or merely by pressure as is known to those skilled in the art.

The pivoting connection structure indicated at 70 in the various views will hold the legs and the bar in a proper configuration for correct support. However, if desired, a horizontal holding bar 90 may be fastened between the legs as shown in FIG. 2.

Figure 3:
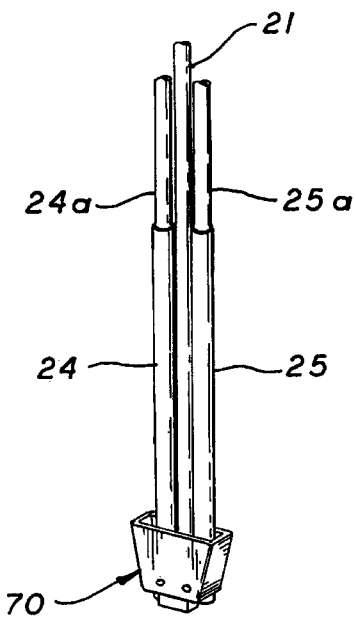
FIG. 3 is a partially broken away schematic of the apparatus of FIG. 2 folded and for storage and transport (without the swing shown in FIG. 2)
Figure 3:
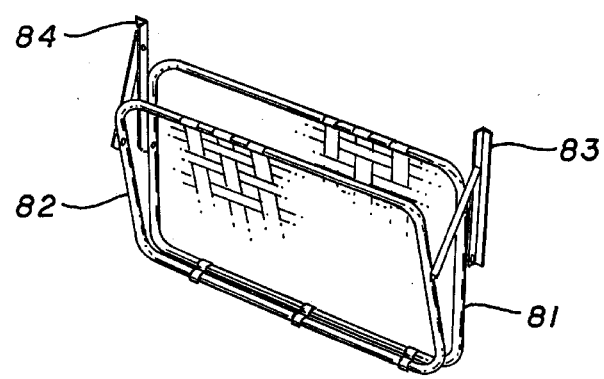
Figure 5:
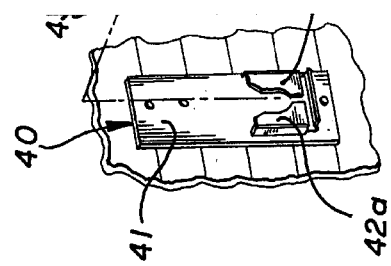
FIG. 5 is a schematic perspective of the swing shown in FIG. 2 partially folded for storage.
Figure 4:
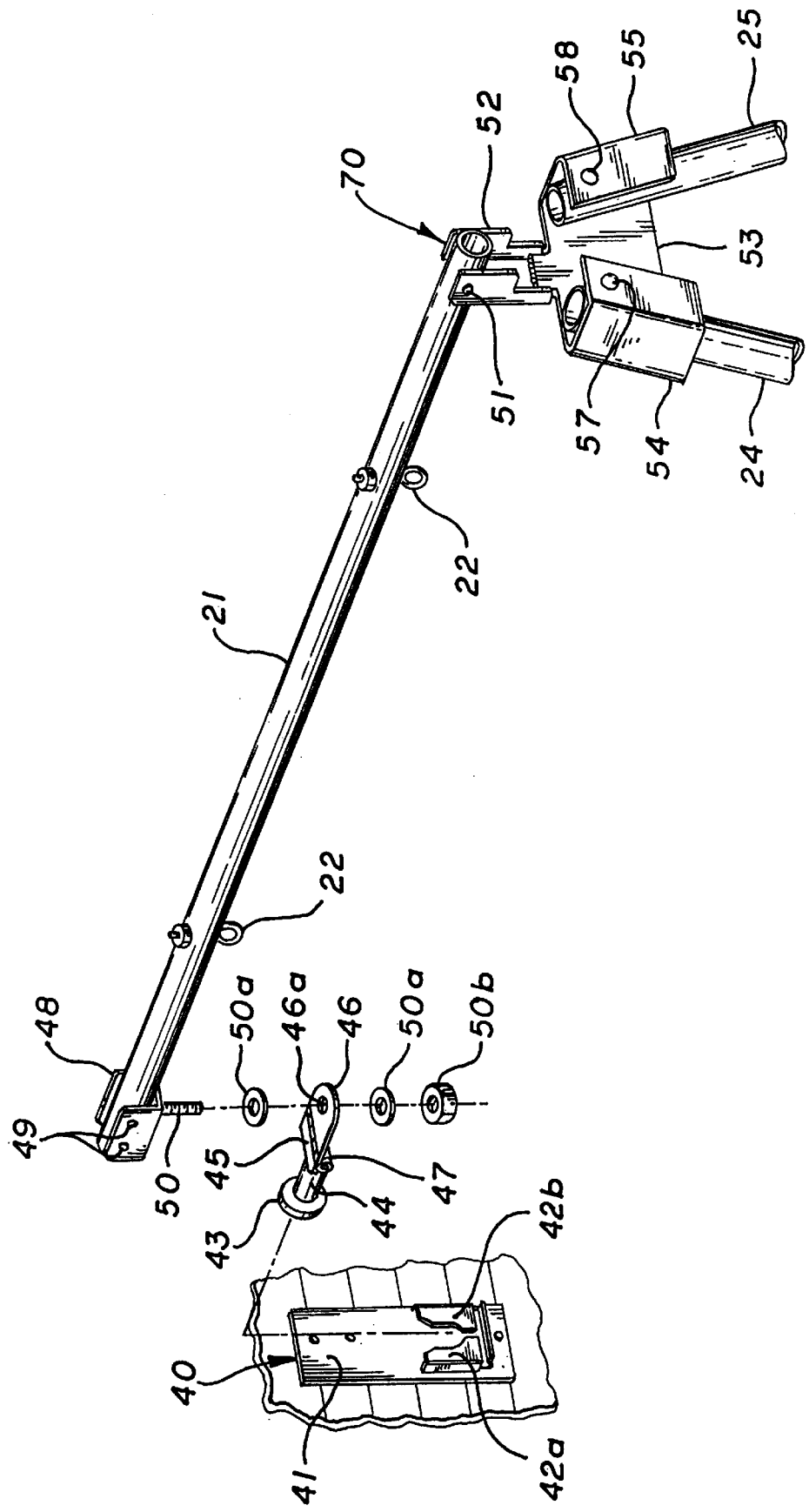
FIG. 4 is a partial, partially exploded, view illustrating the connecting elements for the apparatus as shown in the previous views.

The legs are connected to the bar 21 by a very unique pivoting connection structure 70, the details of which are found in FIG. 4. The manner in which the legs and the bar fold together and are held, when inverted, is clear in FIG. 3.

One of the unusual features of this invention is the inversion of the legs 24–24a and 25–25a when collapsed and stored on the vehicle for transport. In the past known collapsible leg devices the storage is always upright or horizontal, but never inverted in the manner of the present invention.

Examining FIG. 4, it is seen that the connecting-support mechanism 40 consists of a plate 41 welded, bolted, or otherwise affixed to the motor home, or the like. A socket arrangement is formed by the two like segments 42a and 42b, welded, or otherwise appropriately affixed to plate 41. A flange 43 is welded, or otherwise appropriately affixed to a connecting extension 44. This flange 43 is so configured as to be removably held in the socket formed by the segments 42a and 42b. The connecting extension 44 is welded or otherwise appropriately affixed to one leg 45 of a hinge 47. The other leg 46 of the hinge 47 has a hole 46a, which accommodates bolt 50 and is fastened to the leg 46 by means of washer 50a and nut 50b. The bolt 50 is welded or otherwise appropriately affixed to a channel member 48. One end of the leg 21 is affixed within the channel 48 by rivets or the like 49.

The other end of the leg 21 is drilled so as to accommodate pivot pin or the like 51 within channel member 52. Channel member 52 is welded, or otherwise appropriately affixed to plate 53. Plate 53 is configured so as to form two channel-like members 54 and 55. These members 54 and 55 are drilled, as are legs 24 and 25 so as to accommodate pivot pins 57 and 58.

As will be seen in FIG. 3, the pivoting arrangements on the ends of horizontal bar 21 and legs 24–24a and 25–25a allow the bar to pivot downward on the side of the motor home 10 and the legs 24–24a and 25–25a to collapse and telescope together and to be inverted so that their feet are in an upward position for travel.

The swing 80, which I consider to be a unique sub-invention in itself, is seen to consist of a back 81, a seat 82 pivotally connected to the back, two armrest hinged braces 83 and 84, and two triangular chain hangers 85 and 86. This swing, being constructed in this manner, is the only swing known to me to be collapsible into a flat unit suitable to be carried in the storage compartment of a motor home or the like and still leave room for other cargo in the storage compartment.

I have illustrated a swing supported by the structure described in this specification. It is clear that the structure could support game while being dressed, could be used for drying clothes, could be used to hold packages of food at an elevation, and the like.

Throughout the foregoing portions of this specification, and as they may occur in the following claims and abstract, I have used words such as "bar", "bolt", "weld", "chain", "tubing", and the like. It must be understood that these and other such terms are not intended to be limiting. For example, words such as "beam", "screw", "joined", "cable", "elongate member " and the like could be used. Therefore, it is intended that all equivalent elements are deemed included in the descriptions of specific items referred to.

While the embodiments shown and described are fully capable of achieving the objects and advantages desired, it is understood that such embodiments are for purposes of illustration only and not for purposes of limitation.

I claim:

1. A collapsible swing comprising: a swing back; a swing seat pivotally connected to said swing back; a first two piece hinged armrest member pivotally connected at a first end to the upper right side of the swing back and pivotally connected at a second end to the right front of the swing seat; a second two piece hinged armrest member pivotally connected at a first end to the upper left of the swing back and pivotally connected at a second end the left front of the swing seat; a first swing hanger comprising a first chain connected at a first end to an elongate horizontal support beam supported by two legs in an inverted "v" shape at a first end of the beam and a legless adapter attached to a vehicle at a second end of the beam, and connected at a second end to a first end of a second chain and a first end of a third chain, a second end of said second chain being connected to the upper right of the swing back, and a second end of said third chain being connected to the right front of the swing seat; a second swing hanger comprising a fourth chain connected at a first end to the horizontal support beam at a spaced distance from the connection of the first chain to the beam and connected at a second end to a first end of a fifth chain and a first end of a sixth chain, a second end of said fifth chain being connected to the upper left of the swing back, and a second end of said sixth chain being connected to the left front of the swing seat.

* * * * *